(No Model.)
H. A. MILLER.
HORN TIP.
No. 379,077. Patented Mar. 6, 1888.
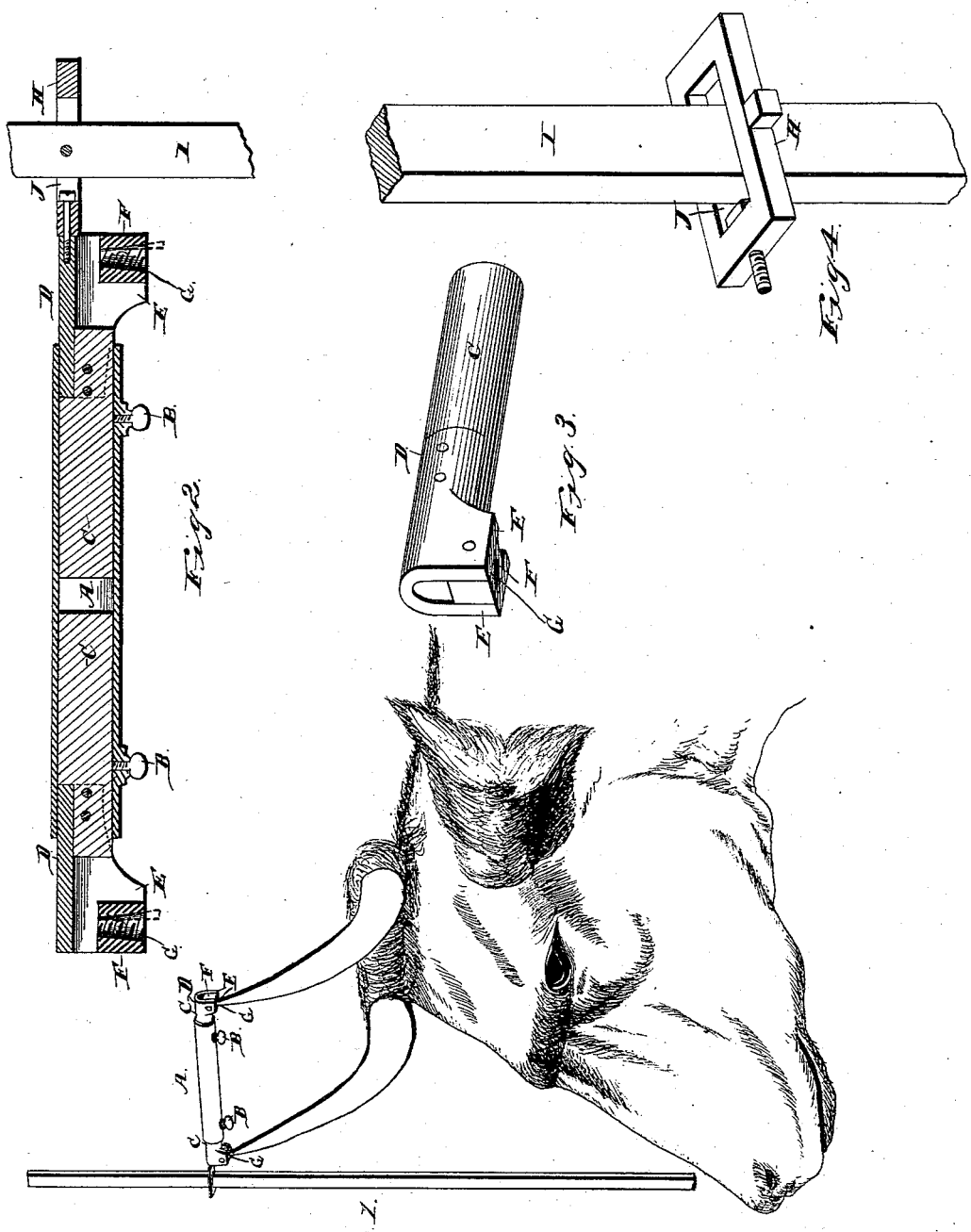
Witnesses
Geo. H. ____
R. W. Bishop.
Inventor.
H. A. Miller.
By his Attorneys.
C. A. Knowles

UNITED STATES PATENT OFFICE.

HENRY AUGUST MILLER, OF OGALLALA, NEBRASKA.

HORN-TIP.

SPECIFICATION forming part of Letters Patent No. 379,077, dated March 6, 1888.

Application filed November 14, 1887. Serial No. 255,127. (No model.)

*To all whom it may concern:*

Be it known that I, HENRY AUGUST MILLER, a citizen of the United States, residing at Ogallala, in the county of Keith and State of Nebraska, have invented a new and useful Improvement in Horn-Tips, of which the following is a specification.

My invention is a combined horn-tip and animal-poke; and it consists in certain novel features hereinafter described and claimed.

In the accompanying drawings, which fully illustrate my invention, Figure 1 is a perspective view of my improved device applied to an animal's horns. Fig. 2 is a longitudinal sectional view of the device removed from the animal's horns, and Figs. 3 and 4 are detail views.

Referring particularly to the drawings by letter, A designates a tube of suitable dimensions and provided near its ends with the set-screws B.

C C designate short cylindrical wooden rods, which are inserted in the ends of the tube A, and are held therein by the set-screws B, as will be readily understood. The outer ends of these rods are recessed, and in the recesses I secure the metallic plates D D, which have laterally-projecting ears E, between which I swivel the block F. This block F is provided with a central tapered opening, G, which is internally screw-threaded to receive the end of the animal's horn. The plates D extend partially around the end of the rod C, and in the end edge of the same, at the center thereof, I swivel the longitudinally-slotted plate H, which projects from the end of said plates D in line therewith. A rod or bar, I, is inserted through the slot J of the plate H and is pivotally mounted therein.

The construction and arrangement of the several parts of my device being thus made known, the application and advantages of the same will, it is thought, be readily understood and appreciated. The device is secured in position by inserting the ends of the animal's horns in the openings in the blocks F, and if the screw-threads of said openings be found insufficient to hold the device on the horns a key or securing-pin may be used, as indicated in dotted lines in Fig. 1. The block, being swiveled in the plates E, readily accommodates itself to the position or angle of the animal's horns, while the rods C are adjusted in the tube A so as to conform to the distance between the horns. The bar or rod I will prevent the animal jumping or leaning against fences, thereby destroying them; but yet, as the plate H, which carries it, is swiveled, it is free to turn, so as to permit the animal to graze, &c.

It will be seen that I have provided a device which is simple in construction and which will effectually prevent goring by the animal. While I have shown the poke or bar I as applied to one end only of the horn-tip, it will be understood, of course, that it may be applied to either side, or to both sides, if so desired.

Having thus described my invention, what I claim, and desire to secure by Letters Patent, is—

1. A horn-tip consisting of a central tube and blocks secured upon the horns and adjustably held in said tube, substantially as set forth.

2. A horn-tip having a slotted plate swiveled to one end, and a poke-bar inserted through said plate and pivotally mounted therein, substantially as specified.

3. A horn-tip consisting of a tube, rods adjustably secured in the ends of the tube, and blocks carried by said rods and adapted to be secured upon the ends of the horns, as set forth.

In testimony that I claim the foregoing as my own I have hereto affixed my signature in presence of two witnesses.

HENRY AUGUST MILLER.

Witnesses:
F. C. POWERS,
H. P. FORSYTH.